US005220698A

United States Patent [19]

Hannant

[11] Patent Number: 5,220,698

[45] Date of Patent: Jun. 22, 1993

[54] PATIENT SUPPORT TABLES

[75] Inventor: Keith Hannant, Rustington, England

[73] Assignee: Smiths Industries Public Limited Company, London, England

[21] Appl. No.: 949,979

[22] Filed: Sep. 24, 1992

[30] Foreign Application Priority Data

Oct. 5, 1991 [GB] United Kingdom .................. 9121217

[51] Int. Cl.[5] .............................................. A61C 13/00

[52] U.S. Cl. ........................................... 5/611; 5/614; 5/424

[58] Field of Search ..................... 5/601, 611, 614, 424

[56] References Cited

U.S. PATENT DOCUMENTS

| | | | |
|---|---|---|---|
| 3,099,440 | 7/1963 | Burzlaff | 5/614 |
| 4,186,917 | 2/1980 | Rais et al. | 5/614 |
| 4,225,125 | 9/1980 | Lee | 5/614 |
| 4,227,269 | 10/1980 | Johnston | 5/616 X |
| 4,534,077 | 8/1985 | Martin | 5/424 |
| 4,628,556 | 12/1986 | Blackman | 5/424 |
| 4,650,172 | 3/1987 | Wathelet | 5/601 |
| 4,724,554 | 2/1988 | Kowalski et al. | 5/424 X |
| 4,960,271 | 10/1990 | Sebring | 5/611 X |
| 5,116,032 | 5/1992 | Strachan | 5/614 |

FOREIGN PATENT DOCUMENTS

| | | |
|---|---|---|
| 1559945 | 1/1980 | United Kingdom . |
| 2245486 | 1/1992 | United Kingdom . |
| 2242624 | 1/1993 | United Kingdom . |

*Primary Examiner*—Michael F. Trettel
*Attorney, Agent, or Firm*—Pollock, VandeSande and Priddy

[57] ABSTRACT

A surgical operating table has a cover resiliently supported on a base assembly and microswitches that detect displacement of the cover to prevent lowering of the patient support platform. The base assembly has a castor plate and a base plate which is lowered to brake movement of the table over the floor. A pneumatic tube around the base plate senses the presence of an object under the plate and causes the plate to be raised. A tilt switch in a leaf of the platform prevents angular displacement of the platform when its angle exceeds a safe limit.

9 Claims, 1 Drawing Sheet

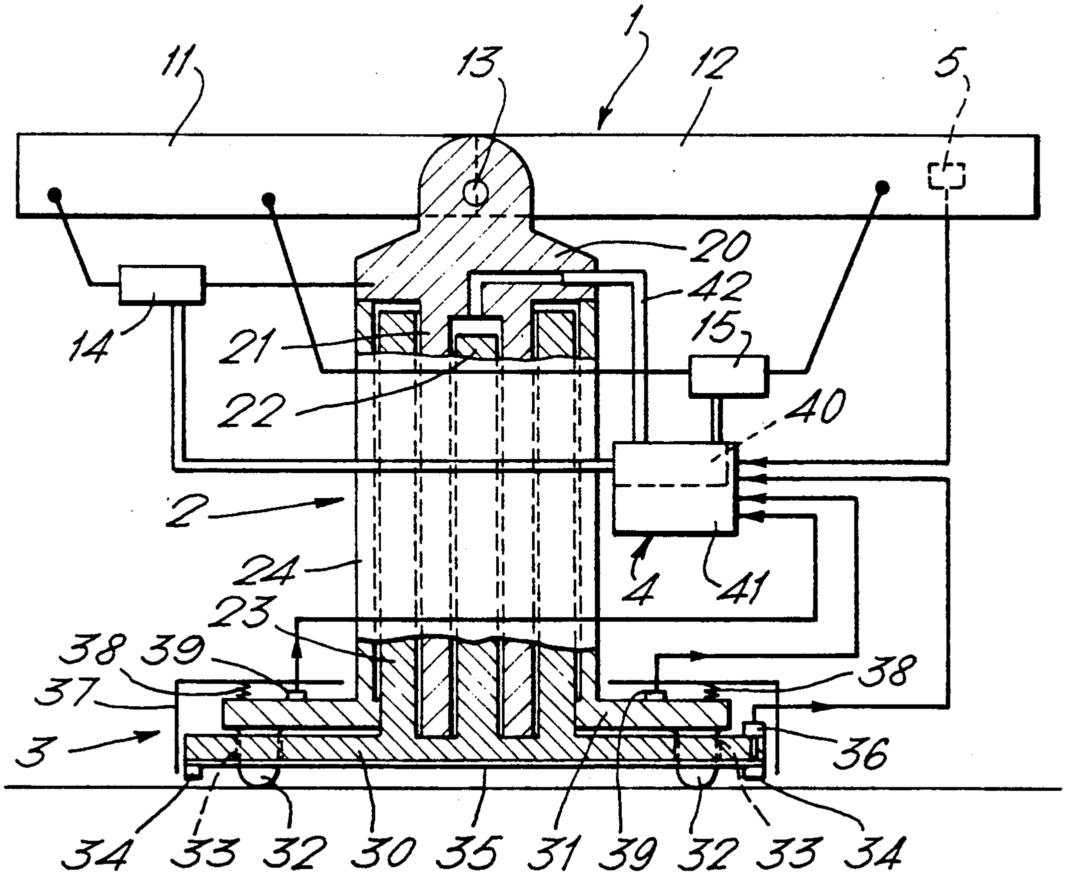
1
11
13
12
5
20
42
14
21
15
22
40
2
4
41
24
23
38
39
37
3
36
34
33
32
30
35
31
39
32
33
34

PATIENT SUPPORT TABLES

BACKGROUND OF THE INVENTION

This invention relates to patient support tables such as surgical operating tables.

Surgical operating tables, such as described in U.S. Pat. Nos. 4,225,125 and 5,116,032, and in British patent GB 2,245,486 are well known. Such tables generally comprise a patient support platform, a base and a support column which supports the platform on the base in such a way that the height of the platform can be altered with respect to the base. It is also known for the base to have several castors and/or a guidewheel that can be brought into contact with the floor to enable movement of the table over the floor. The patient support platform is usually jointed to enable different parts of the patient's body to be supported at different angles with respect to each other according to the surgical procedure being undertaken.

One of the problems with operating tables arises from the weight of the table and the hydraulic or other system by which the table is changed in height or angle. This can cause a risk of injury to the user or damage to the table if the table is not used carefully. It is often the case, however, that the surgeon is under great pressure and it is desirable for him to have confidence that the table can be used safely without special precautions having to be taken.

SUMMARY OF THE INVENTION

It is an object of the present invention to provide an improved patient support table.

According to the present invention there is provided a patient support table having a patient support platform supported above a base adapted to stand on the floor and height control means for controlling the height of the platform above the base, the base having a cover member that is mounted on the base for limited displacement with respect to the base and sensor means for sensing displacement of the cover member with respect to the base such that the sensor means is arranged to prevent the height control means lowering the platform towards the base when displacement of the cover member is sensed.

The table may include a plurality of sensor means arranged to sense displacement of the cover member with respect to the base. The or each sensor means may be a microswitch. The cover member is preferably supported resiliently with respect to the base. The base may have a first member carrying wheels or castors, and a second member carrying feet, the first and second members being displacable relative to one another so that the table can be moved over the floor when the second member is raised and is braked when the second member is lowered, and the second member carrying a contact sensor adapted to prevent lowering of the second member when the sensor contacts an object between the second member and the floor. The height control means preferably raises the second member when the contact sensor contacts an object between the second member and the floor. The contact sensor preferably includes a pneumatic tube extending around the periphery of the second member. The table may include means for altering the angle of the patient support platform relative to the horizontal, and angle sensing means mounted on the platform arranged to prevent angular displacement of the platform in a direction that would increase the angle of the platform to more than a predetermined value. The platform may include several sections along its length, the angle sensing means being mounted on one of the sections.

A surgical operating table in accordance with the present invention, will now be described, by way of example, with reference to the accompanying drawing.

BRIEF DESCRIPTION OF THE DRAWING

The drawing shows the table schematically.

DETAILED DESCRIPTION OF THE PREFERRED EMBODIMENT

The surgical operating table comprises a patient support platform 1, a column 2, a base assembly 3 and an hydraulic system 4 by which the height and angle of the platform is adjusted and the base is braked.

The platform 1 is divided across its longitudinal axis into two leaves 11 and 12 which support the upper trunk and lower trunk respectively of the patient. The two leaves 11 and 12 are hinged relative to one another and to the upper end of the column 2 about a horizontal, lateral axis by a joint 13. Within the lower trunk leaf 12 there is a mercury tilt switch 5, or similar angle sensor, which provides an output signal to the hydraulic system 4 when the angle of the lower trunk leaf 12, with respect to the horizontal, exceeds a predetermined limit. The operation of the tilt switch 5 is described in greater detail below.

The table has an hydraulic actuator 14 coupled between the upper trunk leaf 11 and the column 2 which enables the elevation angle of the platform 1 to be altered; this longitudinal tilting is known as Trendelenberg movement. A second actuator 15 is coupled between the two leaves 11 and 12 and enables the angle between the two leaves to be changed; this actuator is referred to as the break actuator. Further information about the operation of the platform is given in GB 2245486.

The column 2 has an upper head portion 20 which is secured to the platform 1 by the joint 13 and which defines a vertical hydraulic cylinder 21. Within the cylinder 21 there is a piston 22 which projects from the lower end of the cylinder and is joined with a horizontal base plate 30 having rubber feet 34 at each corner. The table is supported on these feet when the base plate is lowered. The base plate 30 also supports a sleeve 23 which extends coaxially of the piston 22 and externally of the cylinder 21. The column 2 also includes a cylindrical housing 24 which extends coaxially up the outside of the sleeve 23 and which is supported at its lower end by a castor plate 31. In the position shown in the drawing, the upper end of the housing 24 abuts and supports the underside of the head portion 20.

The castor plate 31 and the base plate 30 together make up the base assembly 3. The castor plate 31 has four castors 32, one at each corner of the plate, which project through apertures 33 in the base plate 30 and which are rotatable about their vertical axes. The weight of the table can be supported by the castors 32 to enable the table to be turned and moved over the floor in any direction. The base assembly 3 may also have a guide wheel (not shown). Around the periphery of the base plate 30 extends a contact sensor in the form of a pneumatic tube 35 secured to the underside of the base plate. The tube 35 extends to a pressure sensor 36 which in turn is coupled to the hydraulic system 4, in the manner explained later.

The base assembly 3 further includes a metal cover 37 of dome or inverted dish shape. The cover 37 extends over the top of the castor plate 31 and down its sides, being spaced above the floor so as not to impede lowering of the table. The cover 37 is supported on the castor plate 31, for limited displacement relative to the plate, by means of several resilient mountings 38. Located intermediate the cover 37 and the castor plate 31 are several microswitches 39 or similar sensors which provide outputs when the cover 37 is displaced down on its mountings towards the castor plate. The outputs from the microswitches 39 are supplied to the hydraulic system 4.

The height of the patient support platform 1 above the base assembly 3 is adjustable by the hydraulic system 4 which also serves to brake movement of the table over the floor. The hydraulic system 4 includes an hydraulic pump and oil reservoir 40 and a control unit 41. An oil pipe 42 extends from the pump 40 to the upper end of the cylinder 21. When no oil pressure is applied, the volume of the cylinder 21 above the piston 22 is a minimum, as shown in the drawing. An increase in fluid pressure causes an increase in the volume of cylinder 21 above the piston 22, thereby pushing the piston outwardly of the cylinder and increasing the distance between the base plate 30 and the column head 20. In this way, the platform 1 is raised.

When pressure is applied to raise the platform 1, this automatically causes the base plate 30 to be lowered to the ground so that the table is supported by the feet 34 instead of the castors 32. Further description of this operation is given in U.S. Pat. No. 5,116,032. If there is any article, such as the user's foot, between the edge of the base plate 30 and the floor, this will be contacted by the pneumatic tube 35 when the base plate is lowered. This causes a change in pressure detected by the pressure sensor 36 and, in turn, causes a signal to be supplied to the hydraulic system 4 which causes it to prevent further lowering of the base plate. More particularly, it causes the pressure supplied to the column 2 to be reduced so that the base plate 30 rises above the obstacle. This safety feature reduces the risk of injury to the user's toes or feet.

Another safety feature of the table is provided by the microswitches 39 under the cover 37. These sense if there is any weight on the cover 37 above a predetermined limit and supply signals to the hydraulic system 4 to prevent lowering of the platform 1 in such circumstances. Thus, if, for example, the surgeon were resting a foot on the cover 37, lowering of the table would be prevented so that the risk of his foot being crushed by part of the table is prevented. If a part of the table itself were to come into contact with the cover 37, this would also prevent further lowering and reduce the risk of damage to the table.

Damage to the table is also prevented by the tilt switch 5 mounted in the lower trunk leaf 12. If, for example, the platform 1 were moved to a full break down position (with actuator 15 contracted and the right hand end of the lower trunk leaf 12 down) and then the Trendelenberg actuator 14 were extended, the lower parts of the lower trunk leaf 12 could collide with the column 2. Similarly, if the Trendelenberg actuator 14 were extended and then the table were put into a break down position by contraction of the actuator 15, the same situation could arise. The tilt switch 5, however, provides an output when the angle of the lower trunk leaf 12 exceeds a safe limit and this inhibits any supply of hydraulic fluid to the actuators 14 and 15 that would increase the angle of the lower trunk leaf. The risk of damage to the table is, therefore, further reduced.

Having thus described my invention, I claim:

1. A patient support table comprising: a patient support platform; a base adapted to stand on the floor; and means for supporting the platform above the base, the base having a first member carrying a plurality of wheels or castors and a second member carrying a plurality of feet, the table including means for displacing the first and second members relative to one another so that the table can be moved over the floor when the second member is raised and so that the table is braked when the second member is lowered, a contact sensor mounted on the second member, and means connecting the contact sensor to the displacing means such that lowering of the second member is prevented when the sensor contacts an object between the second member and the floor.

2. A patient support table according to claim 1, including height control means for controlling the height of the platform above the base, wherein the base has a cover member, means mounting the cover member on the base for limited displacement with respect to the base, and sensor means for sensing displacement of the cover member with respect to the base such that the sensor means is arranged to prevent the height control means lowering the platform towards the base when displacement of the cover member is sensed.

3. A patient support table according to claim 2, wherein the table includes a plurality of sensors arranged to sense displacement of the cover member with respect to the base.

4. A patient support table according to claim 2, wherein the sensor means is a microswitch.

5. A patient support table according to claim 2, including means for supporting the cover member resiliently with respect to the base.

6. A patient support table according to claim 1, wherein the displacing means is arranged to raise the second member when the contact sensor contacts an object between the second member and the floor.

7. A patient support table according to claim 1, wherein the contact sensor includes a pneumatic tube extending around the periphery of the second member.

8. A patient support table according to claim 1 including; means for altering the angle of the platform relative to the column; angle sensing means; means mounting the angle sensing means on the platform; and means connecting an output of the angle sensing means to the means for altering the angle of the platform such as to prevent angular displacement of the platform when the angle of the platform exceeds a predetermined value.

9. A patient support table according to claim 8, wherein the platform includes several sections along its length, the angle sensing means being mounted on one of the sections.

* * * * *